(12) United States Patent
Warnery et al.

(10) Patent No.: US 11,306,982 B2
(45) Date of Patent: Apr. 19, 2022

(54) HEAT EXCHANGER, AIR INTAKE SYSTEM WITH A HEAT EXCHANGER, AND METHOD FOR MOUNTING A HEAT EXCHANGER

(71) Applicant: MANN+HUMMEL GmbH, Ludwigsburg (DE)

(72) Inventors: Stéphane Warnery, L'Huisserie (FR); Philippe Trotin, Quelaines Saint Gault (FR); Alexander Korn, Gueglingen (DE); Gerrit-Tobias Speidel, Markgroeningen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 253 days.

(21) Appl. No.: 16/401,393

(22) Filed: May 2, 2019

(65) Prior Publication Data

US 2019/0339029 A1    Nov. 7, 2019

(30) Foreign Application Priority Data

May 3, 2018   (EP) .................................... 18290045

(51) Int. Cl.
*F01N 5/02*    (2006.01)
*F28F 9/26*    (2006.01)
(Continued)

(52) U.S. Cl.
CPC .............. *F28F 9/26* (2013.01); *F28D 7/1607* (2013.01); *F28D 2021/0026* (2013.01); *F28F 2275/122* (2013.01)

(58) Field of Classification Search
CPC ...... F28F 9/26; F28F 2275/122; F28D 7/1607; F28D 2021/0026
(Continued)

(56) References Cited

U.S. PATENT DOCUMENTS 4,461,348 A * 7/1984 Toge ..................... F28F 9/0226
  165/149
5,630,470 A * 5/1997 Lockwood, Jr. ...... F28F 9/0229
  165/82

(Continued)

FOREIGN PATENT DOCUMENTS

EP    1376043 A2 * 1/2004 ........... F28D 9/0043
EP    1376043 B1    1/2004
(Continued)

*Primary Examiner* — Claire E Rojohn, III (57) ABSTRACT

A heat exchanger for cooling intake air with a coolant is provided with a shell and first and second front faces, wherein one of the front faces is an inlet and the other an outlet for intake air. The shell has at least one coupling element disposed along a circumferential line of the shell that is spaced apart from the first front face by a predetermined distance. The shell has a port as an inlet or outlet for the coolant. The port is arranged at a spacing from the first front face. The spacing is larger than the predetermined distance. The shell has an insertion section between first front face and circumferential line. The shell has an internal duct system connected to the port for guiding the coolant into the insertion section. The coupling element can fixedly couple with at least one corresponding coupling element of an air duct.

18 Claims, 6 Drawing Sheets

(51) Int. Cl.
*F28D 7/16* (2006.01)
*F28D 21/00* (2006.01)

(58) Field of Classification Search
USPC .......................................................... 165/51
See application file for complete search history.

(56) References Cited

U.S. PATENT DOCUMENTS

| | | | | |
|---|---|---|---|---|
| 8,316,925 B2* | 11/2012 | Pimentel | ............... | F28D 9/0043 |
| | | | | 165/152 |
| 9,038,610 B2* | 5/2015 | Meshenky | ............ | F28D 9/0043 |
| | | | | 123/563 |
| 9,175,596 B2* | 11/2015 | Eilemann | ............ | F28F 9/0075 |
| 9,322,321 B2* | 4/2016 | Brand | .................... | F02B 33/02 |
| 9,890,692 B1* | 2/2018 | Turnage | .................. | F28F 21/02 |
| 10,254,055 B2* | 4/2019 | Bangert | ................ | F28F 9/0241 |
| 2003/0196785 A1* | 10/2003 | Knecht | ................ | F28D 7/1684 |
| | | | | 165/148 |
| 2003/0234099 A1* | 12/2003 | Mota | ..................... | F28F 9/0219 |
| | | | | 165/159 |
| 2007/0175617 A1* | 8/2007 | Brost | ................... | F28F 9/0075 |
| | | | | 165/149 |
| 2009/0272515 A1* | 11/2009 | Wu | ..................... | F02B 29/0462 |
| | | | | 165/140 |
| 2012/0210986 A1* | 8/2012 | Ghiani | .................. | F02M 26/32 |
| | | | | 123/542 |
| 2014/0000850 A1* | 1/2014 | Korn | ................... | F28D 21/0003 |
| | | | | 165/104.19 |
| 2014/0014077 A1* | 1/2014 | Schuricht | ................ | F28F 9/026 |
| | | | | 123/568.12 |
| 2014/0174424 A1* | 6/2014 | Chen | ...................... | F28D 7/087 |
| | | | | 126/116 R |
| 2014/0300105 A1* | 10/2014 | Kalbacher | ............. | F28F 9/0248 |
| | | | | 285/351 |
| 2014/0311142 A1* | 10/2014 | Speidel | .................. | F02B 33/44 |
| | | | | 60/599 |
| 2014/0311143 A1* | 10/2014 | Speidel | ............ | F02M 35/10354 |
| | | | | 60/599 |
| 2015/0013300 A1* | 1/2015 | Axelbaum | ............. | F22B 33/00 |
| | | | | 60/39.15 |

FOREIGN PATENT DOCUMENTS

| | | |
|---|---|---|
| EP | 2501912 A1 | 5/2011 |
| EP | 2715264 B1 | 4/2014 |
| EP | 2856058 B1 | 4/2015 |
| EP | 2972049 B1 | 1/2016 |
| EP | 2998686 A2 | 3/2016 |
| EP | 3001132 B1 | 3/2016 |
| EP | 3088834 A1 | 11/2016 |
| FR | 3039263 A1 | 1/2017 |
| WO | 2014154678 A1 | 10/2014 |
| WO | 2018054463 A1 | 3/2018 |

* cited by examiner

HEAT EXCHANGER, AIR INTAKE SYSTEM WITH A HEAT EXCHANGER, AND METHOD FOR MOUNTING A HEAT EXCHANGER

BACKGROUND OF THE INVENTION

The invention relates to a heat exchanger for cooling intake air, in particular intake air for a combustion engine, an air intake system, and a method for mounting a heat exchanger in an air intake system.

Combustion engines for vehicles, in particular turbocharged combustion engines, are sometimes provided with a heat exchanger for cooling the intake air before it is supplied to the engine. EP 2 501 912 B1 discloses an intake pipe for an internal combustion engine with a heat exchanger, comprising an outer housing of the intake pipe, wherein a feed line for charge air opens into an inlet section of the housing. The heat exchanger is part of the intake pipe system and operated with a cooling fluid. The heat exchanger includes a plurality of flat exchanger tubes. An engine flange is directly fastened to the air outlet side of the heat exchanger, and the air inlet side of the heat exchanger is connected to the intake pipe. The charge air flows through the exchanger tubes in a water jacket formed by an outer housing surrounding the exchanger tubes.

For a given limited space for mounting and coupling the heat exchanger, often the size of the heat exchanger is reduced in order to fit into the available space. However, reducing the size of the heat exchanger can deteriorate its cooling efficiency. Furthermore, the coupling between the heat exchanger and the inlet and outlet air duct usually requires that a coupling tool, e.g. a crimping tool, accesses the coupling portions of the heat exchanger and the inlet and outlet air duct. In order to provide sufficient space for a coupling tool to access the coupling portions, often the size of the heat exchanger is further reduced, thereby further deteriorating the cooling efficiency of the heat exchanger.

In view of the above, it is an object of the invention to provide an improved heat exchanger as well as an improved air intake system. It is a further object to provide a method for mounting a heat exchanger in an air intake system.

SUMMARY OF THE INVENTION

In view of the above, it is an object of the invention to provide an improved heat exchanger as well as an improved air intake system. It is a further object to provide a method for mounting a heat exchanger in an air intake system.

Accordingly, a heat exchanger for cooling air with a coolant is provided. The heat exchanger can be a plate type or a tube type heat exchanger. The heat exchanger comprises: a first and a second front face as an inlet or outlet for the air, respectively, and a shell arranged between the first and the second front face. The shell has at least one coupling element along a circumferential line of the shell, the circumferential line being spaced apart from the first front face by a predetermined distance. Further, the shell has at least one port as an inlet or an outlet for the coolant, the port being arranged at a spacing from the first front face that is larger than the predetermined distance. The at least one coupling element is adapted to fixedly couple with at least one corresponding coupling element of an inlet or outlet air duct, and the shell can comprise a tube arrangement or an internal duct system connected to the port for the coolant and adapted to guide the coolant into an insertion section of the shell. Alternatively the shell can comprise a plate type arrangement. The insertion section is located between the first front face and the circumferential line.

By at least partially inserting the volume of the heat exchanger into one of the air ducts, the installation space is reduced and the coupling elements can be easier accessed.

Having the circumferential coupling elements displaced from the front face may allow for an improved access to the coupling elements and corresponding coupling elements of the air ducts when mounting the heat exchanger in an air intake system of a vehicle.

The air can have atmospheric pressure or can be compressed air (e.g., charged air) that is compressed by a compressor of a turbocharger device or an e-booster. It is understood that when referring to air one can also contemplate a mixture of air and redirected exhaust gas. In operation, the air flows, for example, from the first front face to the second front face of the heat exchanger.

The coolant may be a liquid coolant, e.g. water. As coolant for the heat exchanger the coolant fluid of the engine may be used. The coolant flows, for example, from the (inlet) port of the heat exchanger through the internal tube arrangement to the further (outlet) port of the heat exchanger. The coolant flow within the tube or plate arrangement provides an indirect means to cool the air that flows around the tubes, i.e., that flows at the outside of the tubes. The direction of the coolant flow within the heat exchanger may be perpendicular to the direction of the air flow to provide efficient cooling.

In embodiments, the first front face of the heat exchanger is a face that is permeable to air. The second front face of the heat exchanger may be a face that is permeable to air. The shell of the heat exchanger is air-tight. The shell can comprise a metal material.

The shell, the first front face, and the second front face in conjunction form, for example, a housing of the heat exchanger. The shell, the first front face and the second front face in conjunction can, for example, have a rectangular block shape. In this case, the shell has four rectangular shaped shell sides, and the first front face and the second front face have each a rectangular shape. The shell of the heat exchanger can form a portion of the housing of an intake system.

In embodiments, the shell forms a jacket for the cooling fluid, and the air to be cooled is guided in air tubes through the cooling fluid. Then, the volume enclosed by the jacket corresponds to the tube arrangement.

The insertion section of the shell may comprise portions of the shell between the first front face and the circumferential line as well as the interior volume encompassed by the front face and the portions of the shell. The insertion section accommodates a section of the tube arrangement through which the coolant is guided and around which the air to be cooled flows. The tube arrangement can include, for example, a bent section that is bent in the direction of the first front face. Thus, the coolant is guided into the insertion section in order to cool air also within the insertion section. Thus, active heat exchange between the coolant and the air is taking place within the insertion section of the shell.

It is understood that the embodiment with a tube arrangement not necessarily includes cylindrical or oval tubes. However, the tube arrangement can be implemented by a jacket limiting a volume for the coolant and plates separating the air from the coolant. It is a function of the "tube arrangement" to guide coolant into the insertion section in the direction of the air flow or against the direction of the air flow. One may also refer to an internal duct system for the coolant.

The at least one coupling element of the heat exchanger can be a coupling element comprising a plurality of coupling elements arranged along the circumferential line of the shell. The coupling element(s) is/are adapted to fixedly couple with at least one corresponding coupling element, e.g., a plurality of corresponding coupling elements, of an inlet or outlet air duct.

In embodiments, the at least one coupling element of the heat exchanger comprises a deformable element. The at least one coupling element of the heat exchanger is, for example, configured to engage with a non-deformable coupling element of the inlet or outlet air duct. Alternatively, or additionally, the at least one coupling element of the heat exchanger comprises a crimp element, a clip, a buckle, a lag and/or an engagement element. The at least one coupling element of the heat exchanger can also comprise a section or a spot configured for welding or soldering such as a weld spot or a solder joint.

In embodiments, the at least one coupling element of the heat exchanger comprises an element for a screw connection such as a screw hole or a screw.

The at least one coupling element of the heat exchanger along the circumferential line that is spaced apart from the first front face by a predetermined distance allows to couple the inlet or outlet air duct to the heat exchanger such that the inlet or outlet air duct accommodates partially the heat exchanger in its interior. In other words, a part of the heat exchanger is inserted into the inlet or outlet air duct. Thus, a length of the heat exchanger from the first front face (e.g., the air inlet face) to the second front face (e.g., the air outlet face) is generally larger than the distance between the at least one coupling element of the heat exchanger and the second front face. Thus, the length of the heat exchanger in the direction of the air flow can be larger than the available space for mounting the heat exchanger in an air intake system of a combustion engine.

For a given limited space for mounting the heat exchanger, a larger heat exchanger can be used because a part of the volume of the heat exchanger can be accommodated in the air duct. As there is active heat exchange taking place also within the insertion section of the heat exchanger, as described above, this larger heat exchanger also has a larger area of active heat exchange compared to a heat exchanger that has an active volume only between the flanges of an air inlet and an air outlet. Thus, for a given limited space for mounting the heat exchanger, a heat exchanger with a more efficient cooling can be provided.

Furthermore, the specific arrangement of the at least one coupling element of the heat exchanger may provide sufficient space for a coupling tool, e.g. a crimping tool, to access the at least one coupling element of the heat exchanger and/or the at least one corresponding coupling element of the inlet or outlet air duct without reducing the length, and thus the cooling efficiency, of the heat exchanger.

According to further embodiments, the heat exchanger comprises at least one frame surrounding at least one of the first front face and the second front face, wherein the at least one coupling element of the heat exchanger is attached to the at least one frame. The frame can be integrally formed with the at least one coupling element and/or the shell. Alternatively, the shell can be formed separately. The frame and the at least one coupling element, for example, comprise metal, while the shell, for example, comprises a plastic material. The shell can be formed of a metal as well.

According to further embodiments, the tube arrangement includes flat tubes, in particular a plurality of stacked flat plates. The plurality of stacked flat plates can be stacked in the direction of the air flow direction. The flat plates can have rectangular block shapes with a small height in the direction of the air flow and a large surface area perpendicular to the direction of the air flow. Thereby, large cooling surfaces can be provided and, thus, an efficient cooling is achieved.

According to further embodiments, the tube arrangement includes a bundle of tubes. Thereby, a further flexibility in the tube arrangement can be provided to better accommodate the tubes in the insertion section.

The tube arrangement can be any internal duct system that guides the coolant in a direction perpendicular to the designated air flow and at least partially into the volume comprised by the insertion section. Hence, air to be cooled may flow from the inlet front face to the outlet front face thereby transferring heat to the coolant running through the duct system or tube arrangement. The heat exchanger is preferably implemented to transfer heat from the air to the coolant in the insertion section.

In embodiments, the internal duct system or tube arrangement for the coolant is implemented to divert inflowing or outflowing coolant from a respective inlet port towards the insertion section or from the insertion section towards the outlet port.

According to further embodiments, the at least one coupling element of the heat exchanger comprises a deformable element, in particular a deformable projection configured for crimp coupling, a clip, buckle, lag and/or engagement element.

The at least one coupling element of the heat exchanger may be configured to engage with a non-deformable coupling element of the inlet or outlet air duct.

In embodiments, the at least one deformable coupling element is in direct contact with the shell of the heat exchanger. The deformable coupling element may be integrally formed with the shell. The deformable coupling element and the shell, for example, both comprise metal.

According to further embodiments, the at least one coupling element comprises a non-deformable element configured to couple with a deformable element of the inlet or outlet air duct, in particular by means of a crimp connection, clip connection, buckle connection and/or engaging connection.

The at least one non-deformable coupling element of the heat exchanger can for example be configured to engage with a deformable coupling element of the inlet or outlet air duct.

According to further embodiments, the shell comprises at least one further coupling element arranged at the edge of the shell adjacent to the second front face, the at least one further coupling element being adapted to fixedly couple with at least one corresponding further coupling element of a further inlet or outlet air duct.

Thereby, a further inlet or outlet air duct can be coupled to the heat exchanger at the edge of the shell. Having an asymmetric arrangement of circumferential coupling means with respect to the length direction of the heat exchanger may facilitate the assembly of the heat exchanger in the intake duct.

According to further embodiments, the shell comprises at least one further coupling element along a further circumferential line of the shell, the further circumferential line being spaced apart from the second front face by a further predetermined distance, wherein the at least one further coupling element is adapted to fixedly couple with at least one corresponding further coupling element of a further inlet or outlet air duct, and wherein the tube arrangement is adapted to guide the coolant into a further insertion section of the shell, the further insertion section being located between the second front face and the further circumferential line.

Having both circumferential coupling elements displaced from the first and second inlet or outlet front face may facilitate the access to the coupling elements with a tool to connect the elements and/or activate the fixed coupling with the air ducts.

The port is, for example, an inlet port for the coolant. Then, the further port is, for example, an outlet port for the coolant. The tube arrangement is connected, for example, to the inlet port and the outlet port such that the coolant is guided from the inlet port through the tubes of the tube arrangement inside the shell of the heat exchanger to the outlet port. Thereby, the coolant is guided on its way through the tube arrangement into the insertion section and into the further insertion section of the shell. The insertion section can be used for an active heat transfer from the air to the coolant.

The first front face of the heat exchanger is, for example, an inlet face for the air to be cooled. The second front face is, for example, an outlet face for the cooled air. In this case, the inlet face of the heat exchanger is connected to an inlet air duct, and the outlet face of the heat exchanger is connected to an outlet air duct, respectively. Furthermore, in this case, the coupling element of the heat exchanger is adapted to fixedly couple to a corresponding coupling element of the inlet air duct. Similarly, the further coupling element of the heat exchanger is adapted to fixedly couple to a corresponding further coupling element of the outlet air duct. Further, in this case, the inlet air duct is adapted to accommodate the first front face and the insertion section of the shell. Similarly, the outlet air duct is adapted to accommodate the second front face and the further insertion section.

Thereby, a further inlet or outlet air duct can be coupled to the heat exchanger such that the length of the heat exchanger from the first front face to the second front face is larger than the distance between the at least one coupling element of the heat exchanger and the at least one coupling element of the further inlet or outlet air duct.

Thus, the length of the heat exchanger from the first front face to the second front face can be even larger than the available space for mounting the heat exchanger in the air intake system of a combustion engine. Thus, for a given limited space for mounting the heat exchanger, an even larger heat exchanger with an even larger area of active heat exchange can be provided. Thus, a heat exchanger with an even more efficient cooling can be provided.

Furthermore, the position of the at least one further coupling element of the heat exchanger provides sufficient space for a coupling tool, e.g., a crimping tool, to access the at least one further coupling element of the heat exchanger without reducing the length of the heat exchanger.

The predetermined distance and/or the further predetermined distance may be available at the outside of the respective air duct to employ a tool for connecting the coupling elements. Connecting may include crimping, welding, soldering, clipping, snapping and/or deforming using a specific tool, respectively.

According to further embodiments, a ratio of the predetermined distance and a distance between the first front face and the second front face is more than 5%, preferably more than 10%, even more preferably more than 20%.

The length of the heat exchanger between the first front face and the second front face may be larger than the distance between the at least one coupling element and the second front face by more than 5%, preferably more than 10%, even more preferably more than 20%.

Thus, a heat exchanger with an efficient cooling can be mounted in an air intake system even when the available space for mounting a heat exchanger is by up to 5%, or even up to 10%, or even up to 20% smaller than the length of the heat exchanger.

According to further embodiments, a ratio of the further predetermined distance and the distance between the first front face and the second front face is more than 5%, preferably more than 10%, even more preferably more than 20%.

Thereby, a heat exchanger with an even more efficient cooling can be mounted in an air intake system even when the available space for mounting a heat exchanger is by up to 10%, or even up to 20%, or even up to 40% smaller than the length of the heat exchanger.

According to further embodiments, a distance between the circumferential line and the further circumferential line amounts to between 50 mm and 70 mm, and the distance between the first front face and the second front face amounts to between 55 mm and 85 mm.

Thereby, a heat exchanger having a length ranging between 55 mm and 85 mm can be mounted in an air intake system in which the available space for mounting a heat exchanger is only in the range of 50 mm and 70 mm.

According to further embodiments, the heat exchanger is configured to cool air compressed by a turbocharger. Thereby, a better fuel efficiency for the engine supplied with the cooled air is provided.

According to another aspect of the invention, an air intake system for an internal combustion engine is provided. The air intake system comprises a heat exchanger configured to cool air with a coolant. The heat exchanger comprises a first and a second front face as an inlet or outlet for the air, respectively, and a shell arranged between the first and the second front face. The shell has at least one coupling element along a circumferential line of the shell, the circumferential line being spaced apart from the first front face by a predetermined distance. The shell also has at least one port as an inlet or an outlet for the coolant, the port being arranged at a spacing from the first front face that is larger than the predetermined distance. The air intake system further comprises an inlet or outlet air duct for guiding air to or from the first front face of the heat exchanger. The inlet or outlet air duct has at least one corresponding coupling element adapted to fixedly couple with the at least one coupling element of the heat exchanger. The at least one coupling element and the at least one corresponding coupling element are fixedly coupled to one another. The shell comprises a tube arrangement or an internal duct system connected to the port for the coolant and adapted to guide the coolant into an insertion section of the shell, the insertion section being arranged between the first front face and the circumferential line. Furthermore, the inlet or outlet air duct accommodates the first front face and the insertion section of the shell.

Aspects and embodiments described with respect to the heat exchanger also apply to the intake system including a respective heat exchanger.

The inlet or outlet air duct is in particular configured to guide air to or from the first front face of the heat exchanger. An inlet air duct is, for example, configured to guide air to the first front face (the inlet face) of the heat exchanger. The inlet air duct, for example, guides air compressed by a compressor of a turbocharger to the inlet face of the heat exchanger. An outlet air duct is, for example, configured to guide air away from the second front face (the outlet surface) of the heat exchanger. The outlet air duct, for example, guides air from the outlet face of the heat exchanger to an intake manifold of an engine for providing cooled air to the engine.

In embodiments, the inlet or outlet air duct is at least partially formed by a plastic material, in particular thermoplastic material like polyamide.

In embodiments, the at least one coupling element of the heat exchanger and the at least one corresponding coupling element of the inlet or outlet air duct realize an air-tight coupling. Similarly, the at least one further coupling element of the heat exchanger and the at least one corresponding further coupling element of the inlet or outlet air duct can provide an air-tight coupling. In embodiments, the coupling elements further include a circumferential sealing for tightly coupling the heat exchanger with the air ducts.

In embodiments, the heat exchanger is implemented as explained above or below.

According to further embodiments, the intake system comprises a turbocharger device for compressing the intake air for the heat exchanger. The heat exchanger may be arranged in an air flow path between the turbocharger device and the engine.

According to further embodiments, the at least one corresponding coupling element of the inlet or outlet air duct is a non-deformable element configured to fixedly couple, in particular by means of a crimp connection, with the at least one coupling element of the heat exchanger, wherein the at least one coupling element of the heat exchanger comprises in particular a deformable element.

In embodiments, the inlet and/or outlet air ducts are separate parts, in particular the corresponding coupling elements are not part of the engine or an engine flange.

Further, a method for mounting a heat exchanger in an air intake system for a combustion engine is provided.

The heat exchanger comprises: a first and a second front face as an inlet or outlet for the air, respectively, and a shell arranged between the first and the second front face. The shell has at least one coupling element along a circumferential line of the shell, the circumferential line being spaced apart from the first front face by a predetermined distance. Further, the shell has at least one port as an inlet or an outlet for the coolant, the port being arranged at a spacing from the first front face that is larger than the predetermined distance. The at least one coupling element is adapted to fixedly couple with at least one corresponding coupling element of an inlet or outlet air duct, and the shell comprises a tube arrangement or an internal duct system connected to the port for the coolant and adapted to guide the coolant into an insertion section of the shell. The insertion section is located between the first front face and the circumferential line.

The air intake system further comprises an inlet or outlet air duct configured to guide air to or from the first front face of the heat exchanger, and the inlet or outlet air duct comprises at least one corresponding coupling element.

The method comprises at least one of the steps of:
  inserting the insertion section and the first front face of the shell in the interior of the inlet or outlet air duct;
  bringing the at least one coupling element of the heat exchanger into contact with the at least one corresponding coupling element of the inlet or outlet air duct;
  fixedly coupling the at least one coupling element of the heat exchanger and the at least one corresponding coupling element of the inlet or outlet air duct for providing a fluid connection between the heat exchanger and the inlet or outlet air duct.

In particular, the method has the advantage that for a given limited space for mounting the heat exchanger, e.g., the space between two air ducts, a larger heat exchanger can be provided and fixedly coupled. This is because the heat exchanger matrix reaches into the air duct when the heat exchanger is fixedly coupled within the air intake system. Further, at the same time, there may still be sufficient space for using a coupling tool, e.g. a crimping tool, to access the at least one coupling element of the heat exchanger and/or the at least one corresponding coupling element of the inlet or outlet air duct. This allows an easier and more stable coupling of the heat exchanger.

In embodiments, the method comprises employing a crimping tool at an outer circumferential section of the air duct, wherein the outer circumferential section is opposite to an inner circumferential section of the air duct surrounding the insertion section.

Bringing the at least one coupling element of the heat exchanger into contact with the at least one corresponding coupling element of the inlet or outlet air duct can be construed as abutting the at least one coupling element of the heat exchanger and the at least one corresponding coupling element of the inlet or outlet air duct.

According to further embodiments, the fixedly coupling includes deforming at least one of the at least one coupling element of the heat exchanger and the at least one corresponding coupling element of the inlet or outlet air duct.

The embodiments and features described above and below with reference to the heat exchanger also apply mutatis mutandis to the intake pipe with a heat exchanger and the method for arranging a heat exchanger in an intake pipe.

Further possible implementations or alternative solutions of the heat exchanger, the air intake system, and the method for arranging a heat exchanger inside an intake pipe also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further embodiments, features and advantages of the heat exchanger will become apparent from the subsequent description and dependent claims, taken in conjunction with the accompanying drawings.

In the Figures, like reference numerals designate like or functionally equivalent elements, unless otherwise indicated.

DESCRIPTION OF PREFERRED EMBODIMENTS

Figure 1:
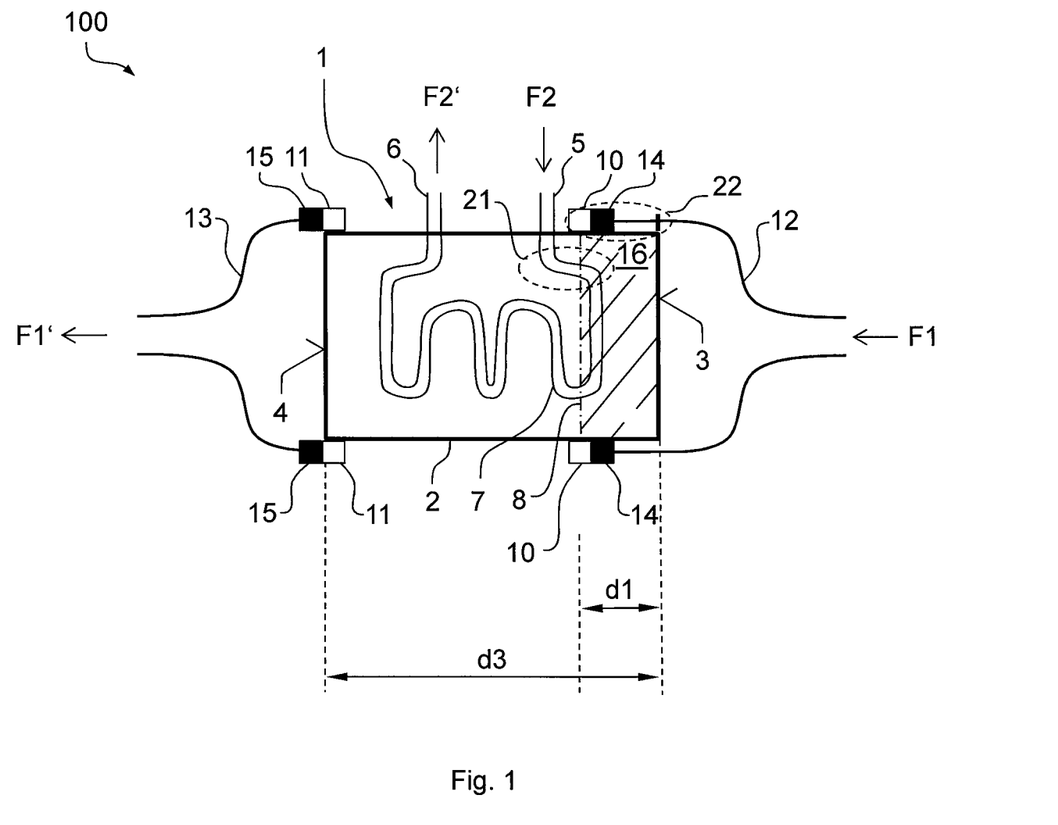
FIG. 1 shows a schematic view of an air intake system with a heat exchanger according to a first embodiment.

FIG. 1 shows a schematic cross-sectional view of an air intake system 100. The air intake system 100 includes a heat exchanger 1 according to a first embodiment. The heat exchanger 1 is provided for cooling intake air F1 with a coolant F2. The heat exchanger 1 comprises a first front face 3 (inlet face) as an inlet for the air F1 and a second front face 4 (outlet face) as an outlet for the air F1', respectively. The heat exchanger 1 further comprises an air-tight shell 2 arranged between the inlet face 3 and the outlet face 4 to guide the air F1 through the interior of the heat exchanger 1. The shell 2, the inlet face 3, and the outlet face 4 in conjunction have a rectangular block shape. The shell 2 has four rectangular shaped shell sides, and the inlet face 3 and the outlet face 4 each have a rectangular shape.

The heat exchanger 1 is connected to an inlet air duct 12. The inlet air duct 12 is configured to guide intake air F1 to the inlet face 3 of the heat exchanger 1. Furthermore, the heat exchanger 1 is connected to an outlet air duct 13. The outlet air duct 13 is configured to guide cooled air F1' from the outlet face 4 of the heat exchanger 1 to the engine of a vehicle (not shown).

The shell 2 has a port 5 as an inlet for coolant F2 and a port 6 as an outlet for the coolant F2', respectively. The coolant runs inside the shell along an interior duct system that can be a tube arrangement 7.

The shell 2 hence comprises a tube arrangement 7 in its interior. The tube arrangement 7 is connected to the inlet port 5 and the outlet port 6 for the coolant F2, F2' such that the coolant F2, F2' is guided from the inlet port 5 through the tubes of the tube arrangement 7 to the outlet port 6.

The coolant flow F2, F2' within the tube arrangement 7 provides an indirect means to cool the air F1, F1' that flows around (i.e., at the outside of) the tubes of the tube arrangement 7. The direction of the air flow from the inlet face 3 to the outlet face 4 in the example of FIG. 1 is substantially transverse to the direction of the coolant flow, whereby an efficient cooling of the air is provided.

The shell 2 has at least one coupling element or elements 10 along a circumferential line 8 of the shell 2. The circumferential line 8 is spaced apart from the inlet face 3 by a predetermined first distance d1. The coupling element 10 is adapted to fixedly couple by means of a crimp connection with a corresponding coupling element 14 of the inlet air duct 12. The corresponding coupling elements 14, 14 of the air ducts 12, 13 are shown as solid blocks. For example, the coupling element 10 of the heat exchanger 1 is implemented as a deformable element, and the corresponding coupling element 14 of the inlet air duct 12 is a non-deformable element. The coupling element 10 of the heat exchanger 1 is configured to engage with the non-deformable coupling element 14 of the inlet air duct 12 in a crimping process. There can be a plurality of coupling elements arranged along the circumference of the shell 2 and/or the respective air duct 12, 13.

Furthermore, the shell 2 has a further coupling element or second coupling element 11 on the left side in the orientation of FIG. 1. The further (left) coupling element or elements 11 is/are adapted to fixedly couple by means of a crimp connection with at least one further corresponding coupling element 15 of the outlet air duct 13. In the embodiment of FIG. 1, the further coupling element 11 is arranged at the edge of the shell 2 adjacent to the outlet face 4. The further coupling element 11 of the heat exchanger 1 is a deformable element, and corresponding further coupling element 15 of the outlet air duct 13 is a non-deformable element. The further coupling element 11 of the heat exchanger 1 is configured to fixedly couple the non-deformable corresponding coupling element 15 of the outlet air duct in a crimping process. The coupling elements 10, 11, 14, 15 fasten the heat exchanger 1 to the air ducts 12, 13 by means of a form closure or a form fit.

The inlet port 5 and the outlet port 6 are arranged between the coupling elements 10, 11. In particular, the inlet port 5 is arranged at a spacing from the inlet face 3 that is larger than the predetermined first distance d1.

The shell 2 includes an insertion section 16 located between the inlet face 3 and the circumferential line 8. The insertion section 16 is indicted by the crosshatched region and comprises portions of the shell 2 between the inlet face 3 and the circumferential line 8 as well as the interior volume between the line 8 and the inlet face 3. The insertion section 16 accommodates a section of the tube arrangement 7 through which the coolant F2, F2' is guided. The air F1, F1' flows around the tube arrangement 7 in the interior of the shell 2 and transfers heat to the coolant in the tube arrangement 7. In the example of FIG. 1, the tube arrangement 7 includes a bent section 21 that is bent in the direction of the inlet face 3. Thus, the coolant F2, F2' is guided on its way through the tube arrangement 7 into the insertion section 16 of the shell 2 in order to cool air F1, F1' also within the insertion section 16. Hence, active heat exchange between the coolant F2, F2' and the air F1, F1' is taking place also within the insertion section 16 of the shell 2.

The arrangement of the at least one coupling element 10 of the heat exchanger 1 along the circumferential line 8 that is spaced apart from the inlet face 3 by a predetermined first distance d1 allows to couple the inlet air duct 12 to the heat exchanger 1 such that the inlet air duct 12 accommodates a part of the heat exchanger 1, namely the insertion section 16, in its interior. Therefore, a length d3 of the heat exchanger 1 from the air inlet face 3 to the air outlet face 4 is larger than the distance between the coupling element 10 of the heat exchanger 1 and the outlet face 4. Thus, the heat exchanger 1 is configured such that its length d3 in the direction of the air flow can be larger than the available space for mounting the heat exchanger 1 in an air intake system of a combustion engine. The space for mounting is sometimes limited by the mounting distance between the openings of the inlet and outlet air ducts 12, 13. Hence, for a given limited space for mounting the heat exchanger 1, a heat exchanger having a matrix larger than the mounting distance can be used. As there is active heat exchange taking place also within the insertion section 16 of the heat exchanger 1, as described above, this larger heat exchanger also has a larger area of active heat exchange (matrix). Thus, for a given limited space for mounting the heat exchanger 1, a heat exchanger 1 with a more efficient cooling can be provided.

Furthermore, the arrangement of the coupling element 10 of the heat exchanger 1 being spaced apart from the front face 3 provides sufficient space for handling a coupling tool without reducing the length, and thus the cooling efficiency, of the heat exchanger 1. In particular, there is sufficient space for a crimping tool to access the at least one coupling element 10 of the heat exchanger 1 and/or the at least one corresponding coupling element 14 of the inlet air duct 12. As illustrated in FIG. 1, the heat exchanger 1 provides sufficient space in the region 22 to the left of the coupling arrangement (coupling elements 10, 14) for handling a crimping tool, for example, between the at least one coupling element 10 and the inlet port (inlet pipe) 5 as well as between the at least one corresponding coupling element 14 of the inlet air duct 12 and the edge of the shell 2 adjacent to the inlet face 3.

Figure 2:
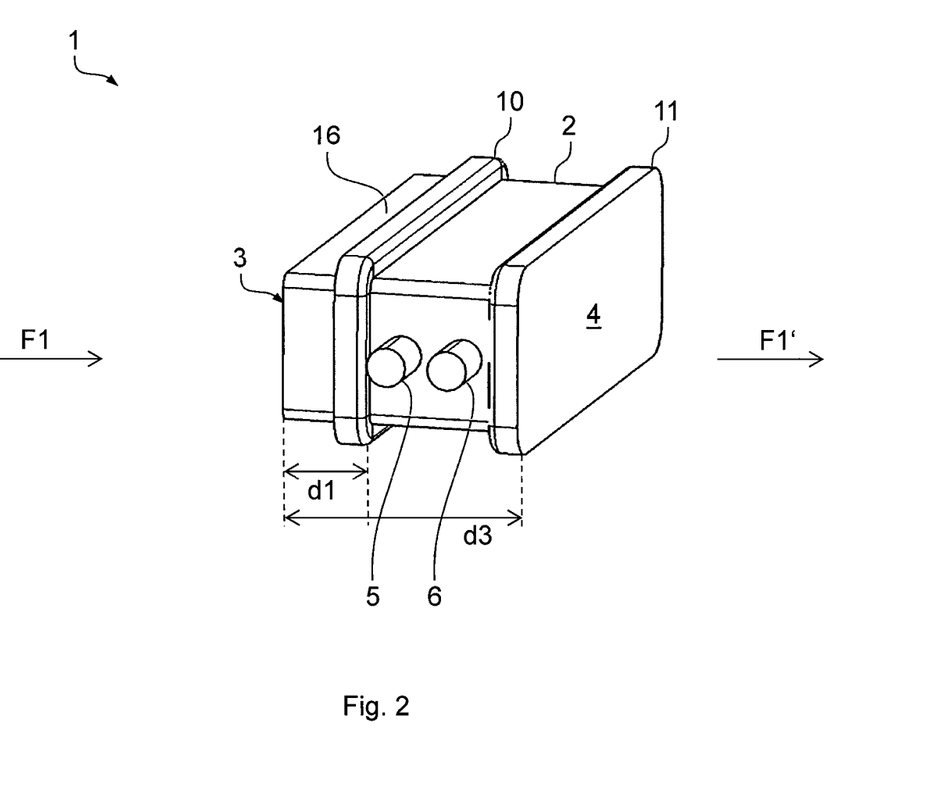
FIG. 2 shows a perspective view of the heat exchanger of FIG. 1.

FIG. 2 shows a perspective view of the heat exchanger of FIG. 1 without the inlet and outlet air ducts 12, 13. As can be seen in FIG. 2, the coupling element 10 of the shell 2 is arranged circumferentially at the outside of the shell 2 and is spaced apart from the inlet face 3 of the shell 2 by a predetermined first distance d1. Thereby, an extension of the shell 2 extending beyond the coupling element 10 (in the orientation of FIG. 2 to the left) by a length (d1) can be seen. This extension of the shell 2 encloses the above described insertion section 16 and is configured to be inserted into an inlet or outlet air duct 12, 13. In the embodiment of FIG. 1, the insertion section 16 is configured to be inserted into the inlet air duct 12.

As shown in FIG. 2, another coupling element 11 is arranged at the edge of the shell 2 adjacent to the outlet face 4. In the embodiment of FIG. 1 and FIG. 2, it corresponds to the further coupling element 11 which is adapted to fixedly couple with the corresponding further coupling element 15 of the outlet air duct 13 (see FIG. 1).

Figure 3:
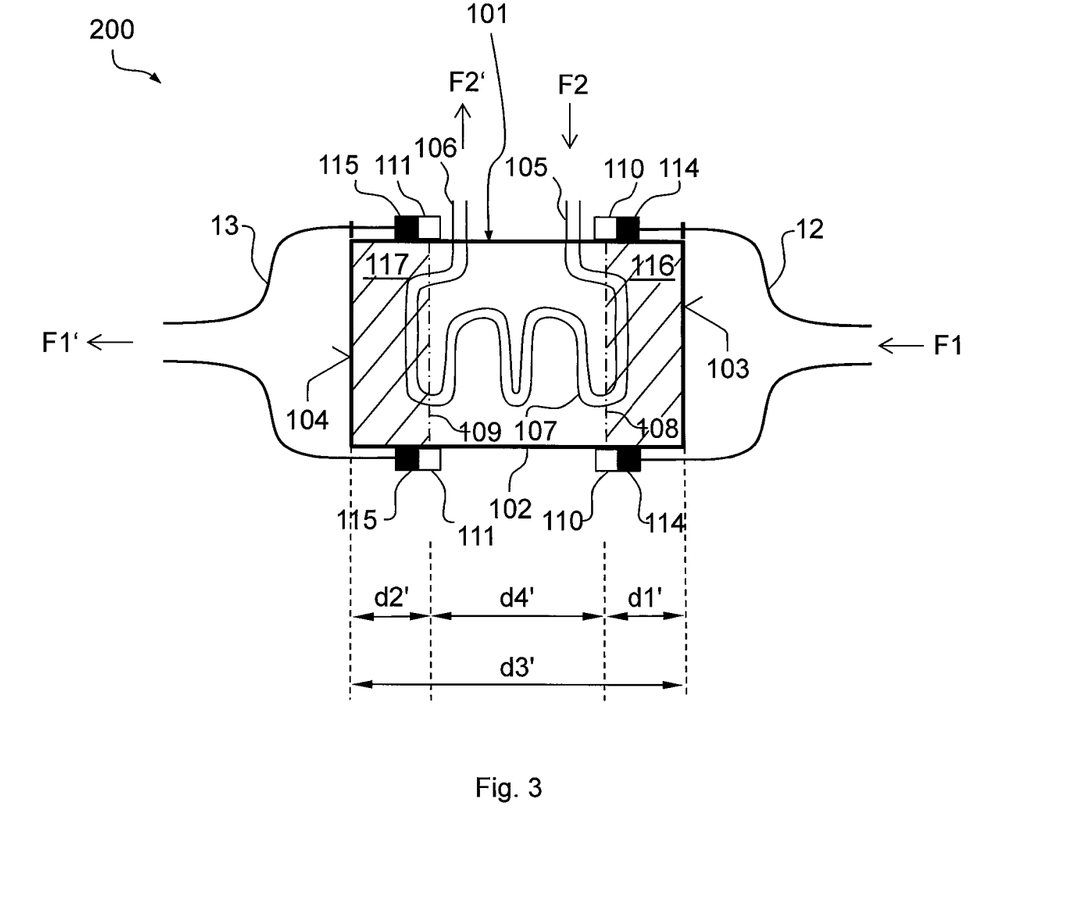
FIG. 3 shows a schematic view of an air intake system with a heat exchanger according to a second embodiment.

FIG. 3 shows a schematic cross-sectional view of an air intake system 200 with a heat exchanger 101 according to a second embodiment. The second embodiment is similar to the first embodiment with the exception of the arrangement of the further coupling element 111 of the heat exchanger 101. Hereinafter, only those features of the second embodiment will be described which are different from that of the first embodiment. A description of same features will be omitted.

As shown in FIG. 3, in the second embodiment the further coupling element 111 of the shell 102 is arranged along a further circumferential line 109 of the shell 102. The further circumferential line 109 is spaced apart from the outlet face 104 by a further predetermined second distance d2'. The further coupling element 111 is adapted to fixedly couple with the further corresponding coupling element 115 of the outlet air duct 13. The tube arrangement 107 is adapted to guide the coolant F2, F2' into a further insertion section 117 of the shell 102. The further insertion section 117 is located between the outlet face 104 and the further circumferential line 109.

In the second embodiment, the inlet air duct 12 is further adapted to accommodate the inlet face 103 and the insertion section 116 of the shell 102. Similarly, the outlet air duct 13 is adapted to accommodate the outlet face 104 and the further insertion section 117 of the shell 102.

The length d3' of the heat exchanger 100 measured from the inlet face 103 to the outlet face 104 is larger than the fourth distance d4' between the coupling element 110 and the further coupling element 111 of the heat exchanger 101.

Thus, the length d3' of the heat exchanger 101 from the inlet face 103 to the outlet face 104 can be even larger than the available space for mounting the heat exchanger 100 in an air intake system of a combustion engine. The mounting space is often limited by the distance between the openings of the inlet and outlet air ducts 12, 13. Thus, for a given limited space for mounting the heat exchanger 100, an even larger heat exchanger 100 with an even larger area of active heat exchange can be provided. Thus, a heat exchanger with an even more efficient cooling can be used.

Furthermore, the specific arrangement of the coupling elements 110, 111 of the heat exchanger 101 provides sufficient space for a coupling tool, e.g. a crimping tool, to access the coupling elements 110, 111 of the heat exchanger 101 and the air ducts 114, 115 without reducing the length d3' of the heat exchanger 100 or extending the mounting distance between the air ducts 12, 13.

FIG. 4 to FIG. 7 illustrate steps involved in a method for mounting the heat exchanger 1 of FIG. 1 inside an air intake system 200 of a combustion engine.

Figure 4:
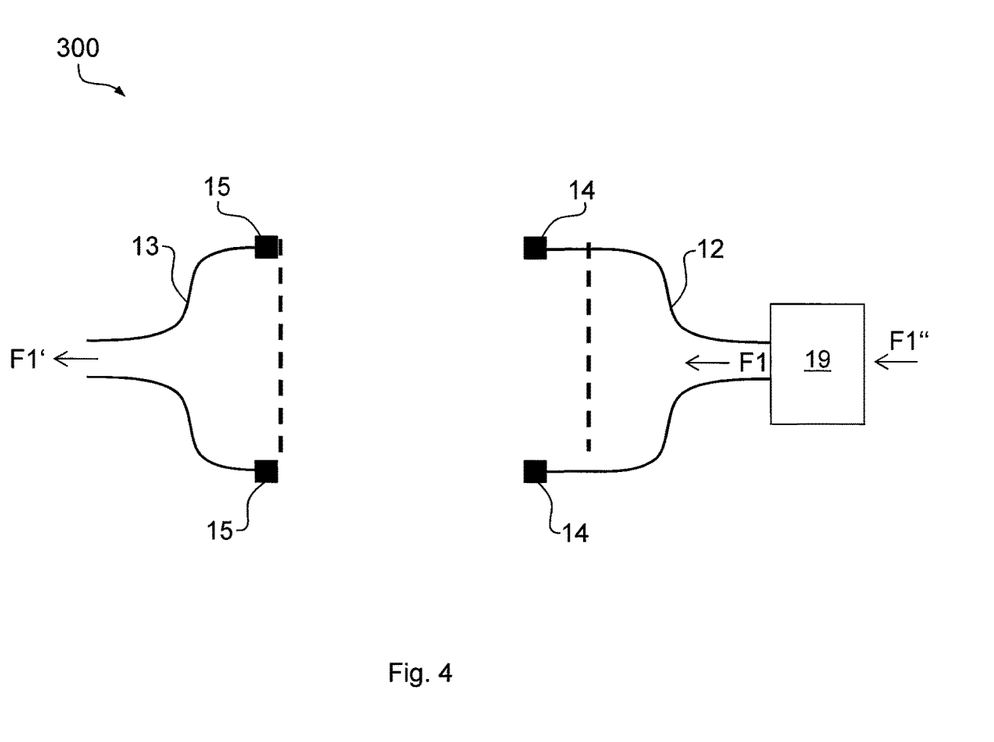
FIG. 4, FIG. 5, FIG. 6, and FIG. 7 illustrate method steps for mounting a heat exchanger in an air intake system of a combustion engine.

In a first step, as shown in FIG. 4, an inlet air duct 12 and an outlet air duct 13 similar to the respective inlet air duct 12 and the outlet air duct 13 shown in FIG. 1 are provided. FIG. 4 shows the air intake system 300 without a heat exchanger.

Figure 5:
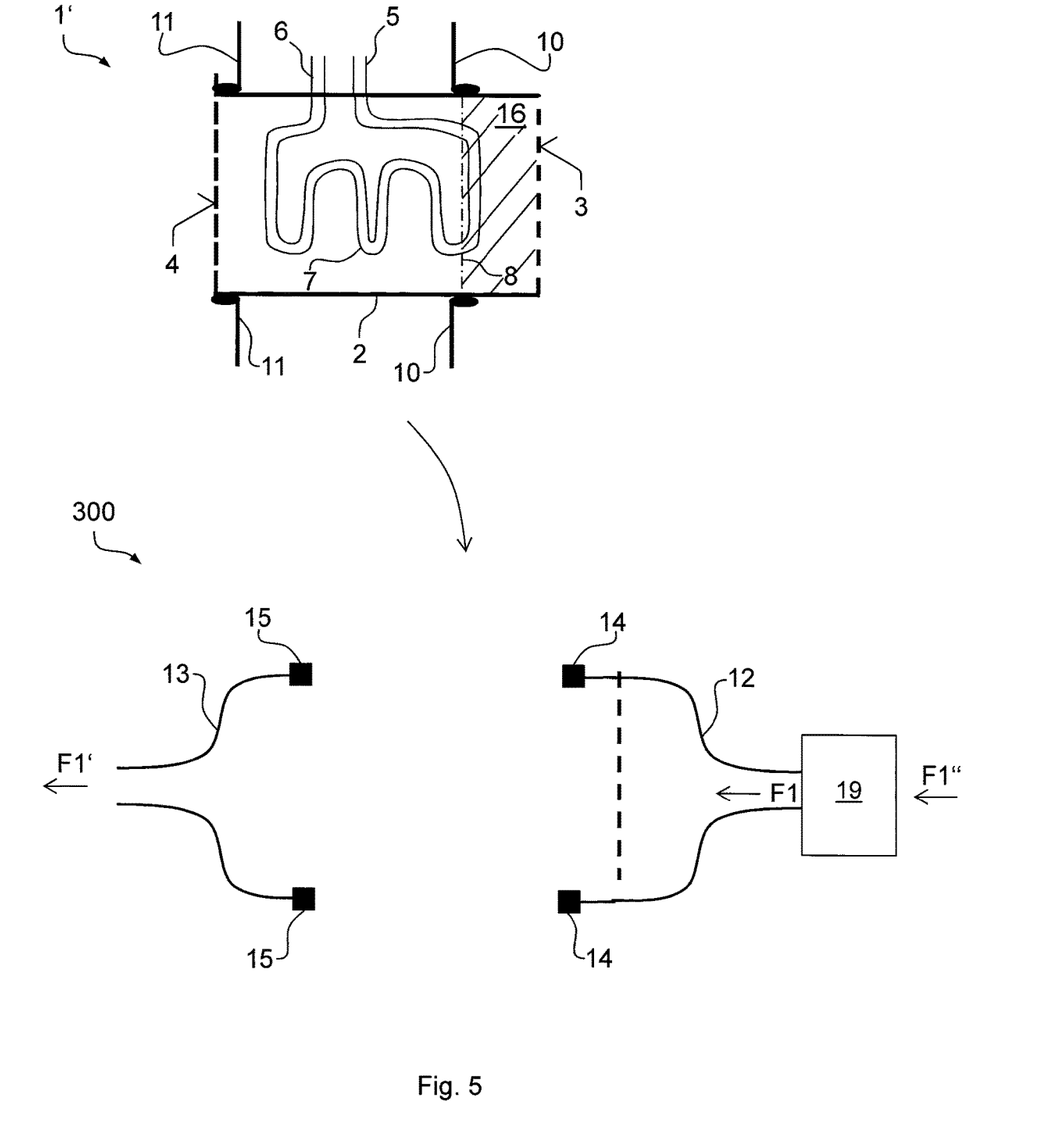

The inlet air duct 12 of the air intake system 300 is connected to a turbocharger 19. The inlet air duct 12 receives air F1 compressed by a compressor of the turbocharger 19. The inlet air duct 12 guides the compressed air F1 to an inlet face 3 of a heat exchanger 1' to be mounted between the air ducts 12, 13. FIG. 5 shows a respective heat exchanger 1'. FIGS. 4 and 5 show the outlet air duct 13 of the air intake system 300. The outlet air duct 13 is configured to guide air F1' cooled by a heat exchanger 1' to be installed from the outlet face 4 of the heat exchanger 1' (see FIG. 5). The outlet air duct 13 guides the cooled air F1' from the outlet face 4 of the respective heat exchanger 1, for example, to an intake manifold of an engine (not shown) for providing cooled air to the engine.

The inlet air duct 12 comprises a corresponding coupling element 14 corresponding to the at least one coupling element 10 of the heat exchanger 1 to be mounted. The least one corresponding coupling element 14 of the inlet air duct 12 is configured to fixedly couple by means of a crimp connection with the at least one coupling element 10 of the heat exchanger 1.

The outlet air duct 13 comprises at least one further corresponding coupling element 15 corresponding to the at least one further coupling element 11 of the heat exchanger 1. The least one corresponding coupling element 15 of the outlet air duct 13 is configured to fixedly couple by means of a crimp connection with the at least one coupling element 11 of the heat exchanger 1.

The distance between the corresponding coupling element 14 of the inlet air duct 12 and the corresponding coupling element 15 of the outlet air duct 13 represents the available space for mounting a heat exchanger. In other words, the configuration of the inlet air duct 12 and the outlet air duct 13 shown in FIG. 4 allows to mount only such a heat exchanger for which the distance between its two (sets of) coupling elements 10, 11 corresponds to the distance between the two (sets of) corresponding coupling elements 14, 15 of the inlet and outlet air ducts 12, 13.

As shown in FIG. 5, in the second step also a heat exchanger 1' similar to the heat exchanger 1 of FIG. 1 and FIG. 2 is provided. For a detailed description of the features of the heat exchanger 1', reference is being had to the description of FIG. 1 and FIG. 2. The coupling elements 10, 11 can be deformable metal flaps or latches that can be used for a crimp connection with the corresponding coupling elements 14, 15 of the air ducts 12, 13.

As described with reference to FIG. 1 and FIG. 2, coupling element 10 at the shell 2 of the heat exchanger 1 is advantageously arranged along the circumferential line 8 of the shell 2 which is spaced apart from the inlet face 3 by a predetermined first distance d1. In this manner, the insertion section 16 is defined which is to be inserted into the inlet air duct 12. Thus, the heat exchanger 1 has a length between the inlet face 3 and the outlet face 4 that is larger than the distance between the coupling element 10 and the coupling element 11. Furthermore, the advantageous arrangement of the coupling element 10 also provides sufficient space for a coupling tool to access the coupling element 10 and corresponding coupling element 14, as will be described later.

In the illustrated example, the further coupling element 11 of the shell 2 of the heat exchanger 1 is arranged at the edge of the shell 2 adjacent to the outlet face 4.

The coupling element 10 and the coupling element 11 of the heat exchanger 1 are both deformable elements. The corresponding coupling element 14 of the inlet air duct 12 and the corresponding coupling element 15 of the outlet air duct 13 are both non-deformable elements. The coupling elements 10 and 11 are both configured to be crimped or coupled with the corresponding coupling element 14 of the inlet air duct 12 and the corresponding coupling element 15 of the outlet air duct 13, respectively. FIG. 5 shows a state in which the deformable coupling elements 10 and 11 are not yet deformed.

Figure 6:
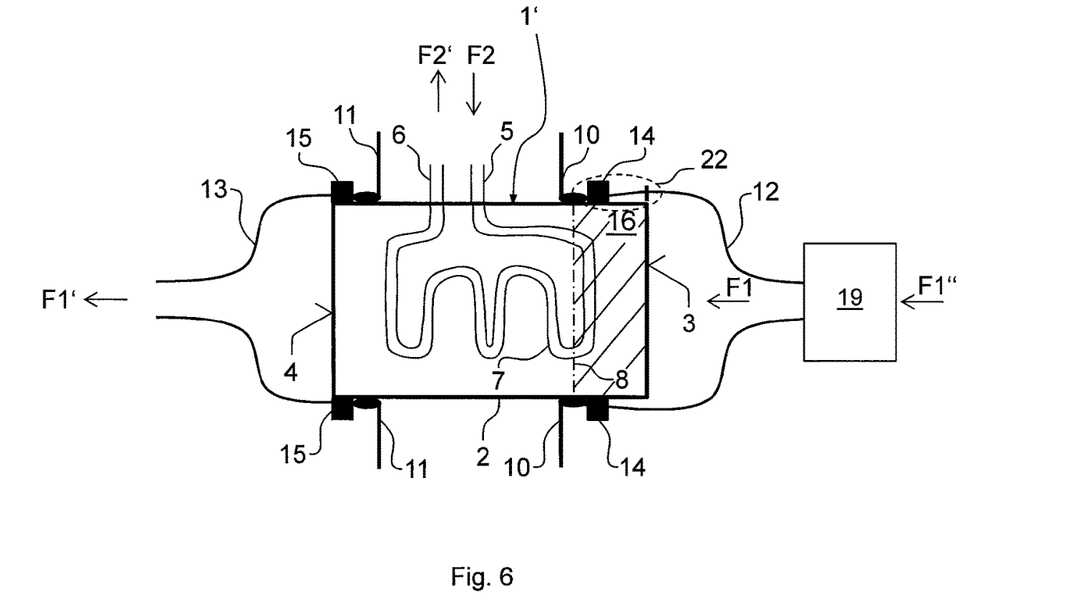

In a third step, as shown in FIG. 6, the insertion section 16 and the inlet face 3 of the heat exchanger 1' are inserted into the interior of the inlet air duct 12.

Next, as shown in FIG. 6 as well, the coupling element 10 of the heat exchanger 1' is brought into contact with the corresponding coupling element 14 of the inlet air duct 12. Furthermore, the further coupling element 11 of the heat exchanger 1 is brought into contact with the further corresponding coupling element 15 of the outlet air duct 13. Thereby, the coupling element 10 and corresponding coupling element 14 abut and likewise the coupling element 11 and corresponding coupling element 15 abut. In FIG. 6, a handling space 22 to the left of the coupling element (flap) 10 is indicated that is available for a crimp tool.

Figure 7:
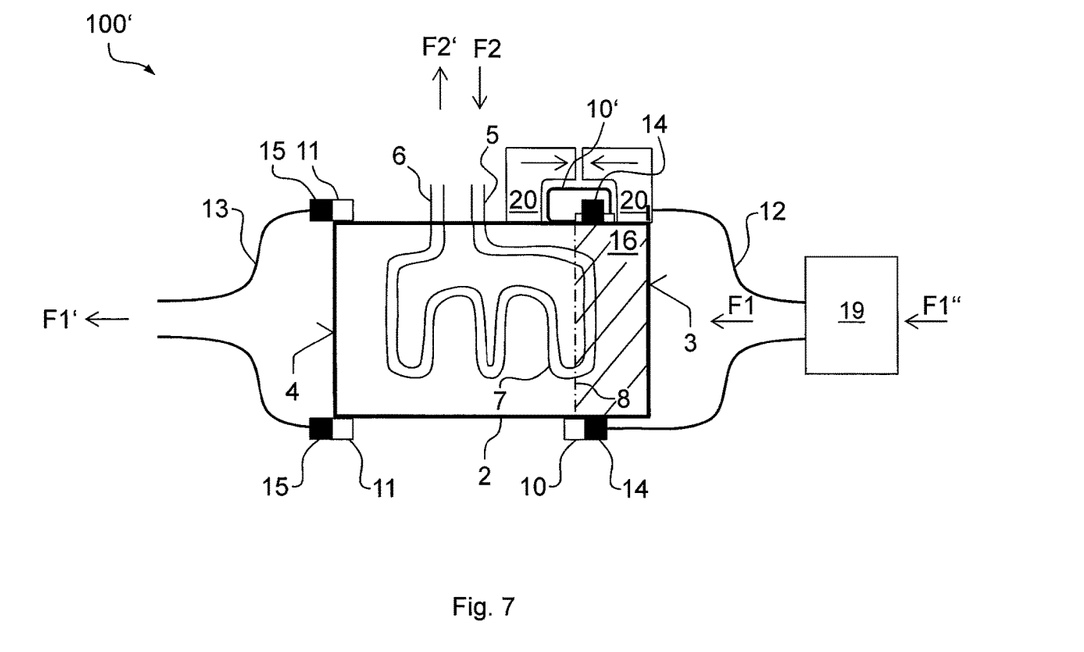

In a further step, as shown in FIG. 7, the coupling element 10 of the heat exchanger 1' and the corresponding coupling element 14 of the inlet air duct 12 are fixedly coupled to each other by deforming the flap 10 with a respective tool 20. Hence, a fluid connection between the heat exchanger 1' and the inlet air duct 12 is achieved. As shown in FIG. 7, fixedly coupling is performed by deforming the flap 10 with a crimping tool 20 such that a form fit with the non-deformable coupling element 14 of the air duct 12 is produced.

As illustrated in FIG. 7, the advantageous arrangement of the at least one coupling element 10 spaced apart from the inlet face 3 by the first distance d1 provides sufficient space 22 (see FIG. 6) for the crimping tool 20 to access the coupling element 10 and corresponding coupling element 14. This allows an easier and more stable coupling of the heat exchanger 1 to the inlet air duct 12.

Furthermore, as shown in FIG. 7, the further coupling element 11 to the left of the heat exchanger 1 and the further corresponding coupling element 15 of the outlet air duct 13 are fixedly coupled to each other for providing a fluid connection between the heat exchanger 1 and the outlet air duct 13. Fixedly coupling of coupling element 11 and corresponding coupling element 15 is performed by deforming the at least one coupling element 11 with the crimping tool 20 such that it encloses the non-deformable coupling element 15. Other fixed coupling measures can be contemplated, e.g. soldering, welding, press fitting, employing clips or buckles. It is however an advantage that the heat exchanger is partly inserted into the air ducts thereby leaving space for the use of coupling tools.

Although the present invention has been described in accordance with preferred embodiments, it is obvious for the person skilled in the art that modifications are possible in all embodiments. For example, the heat exchanger can be a plate-type or tube-type heat exchanger. Other form fitting couplings than crimp couplings can be contemplated. The heat exchanger can be used in other than turbo charger applications where mounting space is limited.

What is claimed is:

1. A heat exchanger for cooling intake air with a coolant, the heat exchanger comprising:
   a first front face and
   a second front face,
      wherein one of the first and second front faces is an inlet for an intake air to be cooled and a different one of the first and second front faces is an outlet for the intake air;
   a shell comprising
      at least one first coupling element disposed along a first circumferential line of the shell, wherein the first circumferential line is spaced apart from the first front face by a predetermined first distance;
   the shell having a shell length (d3) extending axially from the first front face to the second front face of the heat exchanger;
   wherein axial, as used herein, is a direction from the first front face to the second front face of the heat exchanger;
   a coolant tube arrangement arranged in an interior of the shell, the coolant tube arrangement including:
      a coolant inlet port arranged on the shell; and
      a coolant outlet port arranged on the shell;
   wherein the coolant tube arrangement, as used herein, is selected from the group consisting of coolant tubes, flat coolant tubes or a plurality of coolant plates;
   the heat exchanger having active heat exchange region in which heat is actively exchanged between the coolant tube arrangement and the air to be cooled, the active heat exchange region defined as a portion of the shell length which is occupied by the coolant tube arrangement, such that the coolant tube arrangement extends over an entirety of the active heat region portion of the shell length;
   wherein the shell has a first insertion section defined as a portion of the shell length extending axially outwardly beyond the first coupling element of the shell to the first front face;
   wherein the active heat exchange region and the coolant tube arrangement extends axially outwardly beyond the first circumferential line and into the first insertion section in a direction towards the first front face of the heat exchanger, such that the coolant tube arrangement within the shell extends axially outwardly beyond the at least one first coupling element of the shell, such that a the coolant tube arrangement will be received into an interior of a first air duct together with the first front face when the first air duct is coupled to the at least one first coupling element of the shell;
   wherein the coolant inlet port and the coolant outlet port are arranged between and spaced axially way from both the first circumferential line and the second front face;
   wherein the at least one first coupling element is configured to fixedly couple with at least one first corresponding coupling element of the first air duct,
   wherein the coolant tube arrangement guides the coolant into the first insertion section of the shell.

2. The heat exchanger according to claim 1, wherein the at least one first coupling element of the heat exchanger comprises a deformable element.

3. The heat exchanger according to claim 2, wherein the deformable element is selected from the group consisting of a deformable projection configured for crimp coupling; a clip; a buckle; a lag; and an engagement element.

4. The heat exchanger according to claim 1, wherein the at least one first coupling element of the heat exchanger comprises
   a non-deformable element configured to couple with a deformable element of the first air duct.

5. The heat exchanger according to claim 4, wherein
the at least one first coupling element of the heat exchanger is configured to couple by a crimp connection, a clip connection, a buckle connection or an engaging connection with the deformable element of the inlet air duct or of the outlet air duct.

6. The heat exchanger according to claim 1, wherein
the shell further comprises
at least one second coupling element along a second circumferential line of the shell,
wherein the second circumferential line is spaced apart from the second front face by a predetermined second distance,
wherein the shell include a second insertion section defined as a portion of the shell length extending axially outwardly beyond the second coupling element of the shell to the second front face;
wherein the active heat exchange region and the coolant tube arrangement extends axially outwardly beyond the second circumferential line and into the second insertion section in a direction towards the second front face of the heat exchanger, such that the coolant tube arrangement within the shell extends axially outwardly beyond the at least one second coupling element of the shell, such that a the coolant tube arrangement will be received into an interior of the second air duct together with the second front face when the second air duct is coupled to the at least one second coupling element of the shell;
wherein the at least one second coupling element is configured to fixedly couple with at least one second corresponding coupling element of a second air duct,
wherein the coolant tube arrangement guides the coolant into the second insertion section of the shell.

7. The heat exchanger according to claim 1, wherein the heat exchanger is configured for cooling the intake air compressed by a turbocharger device.

8. An air intake system for an internal combustion engine, the air intake system comprising:
a heat exchanger for cooling an intake air with a coolant, the heat exchanger comprising:
a first front face and
a second front face,
wherein one of the first and second front faces is an inlet for the intake air and the other one of the first and second front faces is an outlet for the intake air;
a shell comprising at least one first coupling element disposed along a first circumferential line of the shell,
wherein the first circumferential line is spaced apart from the first front face by a predetermined first distance;
the shell having a shell length (d3) extending axially from the first front face to the second front face of the heat exchanger;
wherein axial, as used herein, is a direction from the first front face to the second front face of the heat exchanger;
a coolant tube arrangement arranged in an interior of the shell, the coolant tube arrangement including:
a coolant inlet port arranged on the shell; and
a coolant outlet port arranged on the shell;
wherein the coolant tube arrangement, as used herein, is selected from the group consisting of coolant tubes, flat coolant tubes or a plurality of coolant plates;
the heat exchanger having active heat exchange region in which heat is actively exchanged between the coolant tube arrangement and the air to be cooled, the active heat exchange region defined as a portion of the shell length which is occupied by the coolant tube arrangement, such that the coolant tube arrangement extends over an entirety of the active heat region portion of the shell length;
wherein the shell has a first insertion section defined as a portion of the shell length extending axially outwardly beyond the first coupling element of the shell to the first front face;
wherein the active heat exchange region and the coolant tube arrangement extends axially outwardly beyond the first circumferential line and into the first insertion section in a direction towards the first front face of the heat exchanger, such that the coolant tube arrangement within the shell extends axially outwardly beyond the at least one first coupling element of the shell, such that a the coolant tube arrangement will be received into an interior of a first air duct together with the first front face when the first air duct is coupled to the at least one first coupling element of the shell;
wherein the coolant inlet port and the coolant outlet port are arranged between and spaced axially way from both the first circumferential line and the second front face;
the air intake system include the first air duct for guiding intake air to or from the first front face of the heat exchanger,
wherein the first air duct comprises
at least one first corresponding coupling element configured to fixedly couple with the at least one first coupling element of the shell of the heat exchanger,
wherein the at least one first coupling element of the shell of the heat exchanger and the at least one first corresponding coupling element of the first air duct are fixedly coupled to one another;
wherein the first air duct receives the first front face and the first insertion section of the shell.

9. The air intake system according to claim 8, wherein
the at least one first coupling element of the shell of the heat exchanger comprises
a deformable element.

10. The air intake system according to claim 9, wherein
the deformable element is selected from the group consisting of a deformable projection configured for crimp coupling; a clip; a buckle; a lag; and an engagement element.

11. The air intake system according to claim 8, wherein
the at least one first coupling element of the shell of the heat exchanger comprises
a non-deformable element configured to couple with a deformable element of the first air duct.

12. The air intake system according to claim 11, wherein
the at least one first coupling element of the shell of the heat exchanger is configured to couple by a crimp connection, a clip connection, a buckle connection or an engaging connection with the deformable element of the first air duct.

13. The air intake system according to claim 8, further comprising
a second air duct,
wherein the shell of the heat exchanger further comprises
at least one second coupling element arranged at an edge of the shell adjacent to the second front face, wherein the at least one second coupling element is configured to fixedly couple with at least one second corresponding coupling element of the second air duct.

14. The air intake system according to claim 8, further comprising
a second air duct,
wherein the shell of the heat exchanger comprises
at least one second coupling element along a second circumferential line of the shell,
wherein the second circumferential line is spaced apart from the second front face by a predetermined second distance,
wherein the shell include a second insertion section defined as a portion of the shell length extending axially outwardly beyond the second coupling element of the shell to the second front face;
wherein the active heat exchange region and the coolant tube arrangement extends axially outwardly beyond the second circumferential line and into the second insertion section in a direction towards the second front face of the heat exchanger, such that the coolant tube arrangement within the shell extends axially outwardly beyond the at least one second coupling element of the shell, such that a the coolant tube arrangement will be received into an interior of the second air duct together with the second front face when the second air duct is coupled to the at least one second coupling element of the shell;
wherein the at least one second coupling element is configured to fixedly couple with at least one second corresponding coupling element of the second air duct,
wherein the coolant tube arrangement guides the coolant into the second insertion section of the shell of the heat exchanger.

15. The air intake system according to claim 8, further comprising
a turbocharger device for compressing the intake air,
wherein the heat exchanger is arranged in an air flow path between the turbocharger device and a combustion engine.

16. The air intake system according to claim 8, wherein the at least one first corresponding coupling element of the first air duct is a non-deformable element configured to fixedly couple with the at least one first coupling element of the heat exchanger.

17. The air intake system according to claim 16, wherein the at least one first corresponding coupling element of the air duct and the at least one first coupling element of the heat exchanger are connected by a crimp connection.

18. The air intake system according to claim 16, wherein the at least one first coupling element of the heat exchanger comprises a deformable element.

* * * * *